(12) United States Patent
Bidenbach et al.

(10) Patent No.: US 8,508,216 B2
(45) Date of Patent: Aug. 13, 2013

(54) MONOLITHIC SENSOR ARRANGEMENT AND METHOD FOR CONTROLLING A MONOLITHIC SENSOR ARRANGEMENT

(75) Inventors: Reiner Bidenbach, Voerstetten (DE); Joerg Franke, Freiburg (DE); Joachim Ritter, Loerrach (DE)

(73) Assignee: Micronas GmbH, Freiburg (DE)

( * ) Notice: Subject to any disclaimer, the term of this patent is extended or adjusted under 35 U.S.C. 154(b) by 1822 days.

(21) Appl. No.: 11/803,144

(22) Filed: May 11, 2007

(65) Prior Publication Data

US 2008/0278891 A1 Nov. 13, 2008

(30) Foreign Application Priority Data

May 11, 2006 (DE) .......................... 10 2006 002 283

(51) Int. Cl.
*G01R 15/20* (2006.01)

(52) U.S. Cl.
USPC ...................................................... 324/117 H

(58) Field of Classification Search
None
See application file for complete search history.

(56) References Cited

U.S. PATENT DOCUMENTS

| 5,325,315 A * | 6/1994 | Engel et al. ................. 702/105 |
| 5,406,202 A | 4/1995 | Mehrgardt et al. |
| 5,422,566 A * | 6/1995 | Boenning ................. 324/117 R |
| 5,621,398 A | 4/1997 | Blair et al. |
| 6,484,107 B1 * | 11/2002 | Roper et al. ..................... 702/50 |
| 6,487,912 B1 | 12/2002 | Behm et al. |
| 6,714,049 B2 * | 3/2004 | Shenai et al. .................... 326/82 |
| 7,170,394 B2 * | 1/2007 | Chandler et al. ........... 340/12.32 |
| 7,710,131 B1 * | 5/2010 | Tiernan .................... 324/754.29 |

FOREIGN PATENT DOCUMENTS

| DE | 44 22 387 A1 | 2/1996 |
| DE | 198 19 265 C1 | 8/1999 |
| DE | 199 27 358 A1 | 12/2000 |
| EP | 0 548 391 A1 | 6/1993 |
| EP | 1 219 934 A1 | 7/2002 |
| JP | 2000-224484 A | 8/2000 |
| JP | 2003-510597 A | 3/2003 |

OTHER PUBLICATIONS

English Translation of Japanese Office Action for Japanese Application No. 2007-126335 dated Nov. 29, 2012.

\* cited by examiner

*Primary Examiner* — Jermele M Hollington
*Assistant Examiner* — Trung Nguyen
(74) *Attorney, Agent, or Firm* — Muncy, Geissler, Olds & Lowe, PLLC

(57) ABSTRACT

A monolithic sensor arrangement includes a housing, a sensor integrated in the housing, and two or three connecting contacts deployed on the housing so as to provide a contact with the sensor. The housing also includes an integrated digital circuit includes a freely programmable digital processor, a program memory and a data memory, which are used to control and/or process the functionalities and/or the measured data of the sensor.

15 Claims, 1 Drawing Sheet

MONOLITHIC SENSOR ARRANGEMENT AND METHOD FOR CONTROLLING A MONOLITHIC SENSOR ARRANGEMENT

FIELD OF THE INVENTION

The invention relates to a monolithic sensor arrangement having a sensor integrated into a housing and an associated method of control such an arrangement.

BACKGROUND OF THE INVENTION

DE 198 19 265 C1 describes a method for the parameterizing of an integrated circuit arrangement and an integrated circuit arrangement therefor. The concept is based on an integrated circuit arrangement that has components that have fixed connections to terminals or contacts. The parameters for the circuit arrangement can be defined in advance using the parameterization operation. The parameters are provided to a supply voltage terminal of the circuit arrangement. To this end, the actual parameter data is modulated onto the supply voltage. To detect the parameter data, a comparator connected downstream to the supply voltage terminal tests the applied supply voltage in order to determine whether this voltage exceeds a threshold value. The threshold value level is in this case greater than the normally required supply voltage of the integrated circuit arrangement.

In addition, the integrated circuit arrangement of DE 198 19 265 C1 includes, according to one embodiment, a Hall sensor that is used to detect a magnetic field that influences the integrated circuit arrangement. The detected field information obtained by the sensor is output via an analog output terminal.

It is known to provide housings for, among other things, integrated circuit components that have a great number of so-called pins located at the terminals. It is known that a freely programmable digital processor and other components can be contained in a housing. Usually, two terminals of the housing are thus used to connect supply voltage and a base voltage, and two other terminals are used to connect a ground connection or zero voltage and a supply voltage, as are many other terminals which are used for input and output of data.

Monolithic sensors, for example, in the form of a Hall sensor, wherein two or three terminals are provided in the housing, have been constructed only with analog design. To the extent such devices use digital signal processing components, such sensors employ hardwired digital signal processing components having a defined external interface and use fixed protocols. In the case of two terminals, a supply voltage is connected to one of terminal, while the base or earth voltage is connected to the opposite terminal. In the case of three terminals, a third terminal is provided specifically for the input and output of data. With this type of monolithic sensor, other functions, for example, adjustment or compensation for external interference conditions such as temperature influences, are provided in the housing using a predefined, wired connection. Adjustment or compensation variables can be modified using predetermined algorithms supplied via the wired connection and stored, for example, in registers or an EEPROM.

A disadvantage of such monolithic sensors deployed in this type of housing having two or three terminals is that these sensors cannot be adapted in a flexible manner to new interface standards and to new protocols. In particular, no new algorithms can be tested and implemented for the purposes of digital signal processing and/or for the purposes of an adjustment or a compensation for external interferences.

SUMMARY OF THE INVENTION

An object of at least some embodiments of the present invention is to provide a monolithic sensor in a housing having preferably two or three terminals arranged in a manner enabling a subsequent adaptation to changed operating conditions. In particular, it should be possible to implement new interface standards and protocols, as well as new algorithms for digital signal processing operations and/or for an adjustment of, or a compensation for, external interference factors.

This object is achieved by a monolithic sensor according to at least some embodiments of the invention, as well as by a method for controlling a monolithic sensor according to at least some embodiments of the invention.

According to a first embodiment, a monolithic sensor arrangement includes a housing, a sensor integrated in the housing, and two or three terminals deployed on the housing to provide contact with the sensor, wherein a freely programmable digital processor is integrated in the housing, as well as a program memory and a data memory, which are used to control and/or process the functionalities and or/measurement data of the sensor.

Only two terminals are preferably used for input, for supply voltage, and for reception of data input into the sensor arrangement, as well as for transmission of data output from the sensor arrangement. A supply voltage and a clock signal can be input through one of the terminals.

An integrated interface may suitably be used for demodulation of a clock signal from the input supply voltage. The integrated interface may also be used for the demodulation of data from the supply voltage.

In embodiments having a third terminal, the third terminal is used for unidirectional output of output data from the sensor arrangement, and in particular for the output of the data measured by the sensors. The third terminal thereby provides a high-speed interface for the output of measured data. Measured data can be provided to corresponding internal interconnections, which can be optionally also be used in parallel for a programming operation output through both terminals.

The control device is preferably connected to other circuit components through an integrated bus, and in particular, an 8 bit, 16 bit, or 24 bit address and/or data bus. The integrated interface therefore preferably converts serial data obtained from the terminal to parallel data for use on the bus.

A serial synchronous test circuit-interface is preferably used to operate and/or to control the circuit via a modulated supply voltage and/or current received through the two or three terminals.

The housing can be also equipped with other terminals used to control an external device, such as a storage bus interface or an external storage device, or a programming and/or testing circuit.

The sensor is preferably constructed as a Hall sensor. Other integrated components of the arrangement can be used to generate a clock signal and/or an interrupt signal for the processor. A temperature sensor is advantageously included to provide a temperature signal in order to compensate for temperature conditions.

In another embodiment, a method for controlling a monolithic sensor arrangement includes modulating clock and/or data to be input on a supply voltage and providing the modulated voltage to at least one supply voltage terminal, and wherein at least two voltage levels above a nominal supply voltage level are used by an integrated circuit arrangement of the sensor arrangement.

In yet another embodiment, a method for controlling a monolithic sensor arrangement includes converting or modifying serial input and/or output data using a parallel bus interface within the sensor arrangement, or converting or modifying parallel data from a bus within the sensor arrangement to serial output data.

Accordingly, it is also preferable that the monolithic sensors are implemented with an integrated freely programmable digital processor, so that new interface standards, new protocols and new algorithms for digital signal processing and/or adjustment or compensation for interference factors or variables can be implemented in a simple manner using a software modification. Such software can be stored in the program memory. The monolithic sensor preferably contains, in addition to the actual processor, other components which are normally required for its operation, such as, for example, storage components such as RAM, ROM, flash, input/output modules such as clocks, PWM (Pulse Width Modulation/Impulse Width Modulation), UART (Universal Asynchronous Receiver/Transmitter), SPI (Serial Peripheral Interface) or a CapCom.

In preferred embodiments, the monolithic sensors are integrated into a housing having only two or three terminals. However, it will be understood that in order to provide further functionalities, additional terminals can be provided and deployed on the housing. For example, a special bond-out version of the sensor arrangement having a control device can be provided for a more comfortable and faster software development providing observation points, interruption points, real-time tracking, etc. A similar bond-out chip formed through the housing can differ from its standard version in that it is equipped with additional terminal for test purposes, wherein the terminals preferably provide a connection to important nodes on the actual chip, or in the actual integrated circuit arrangement. Such additional terminals can be used, for example, to form an external storage bus interface or a debugging interface.

The above described features and advantages, as well as others, will become readily apparent to those of ordinary skill in the art by reference to the following detailed description and accompanying drawings.

DETAILED DESCRIPTION

Figure 1:
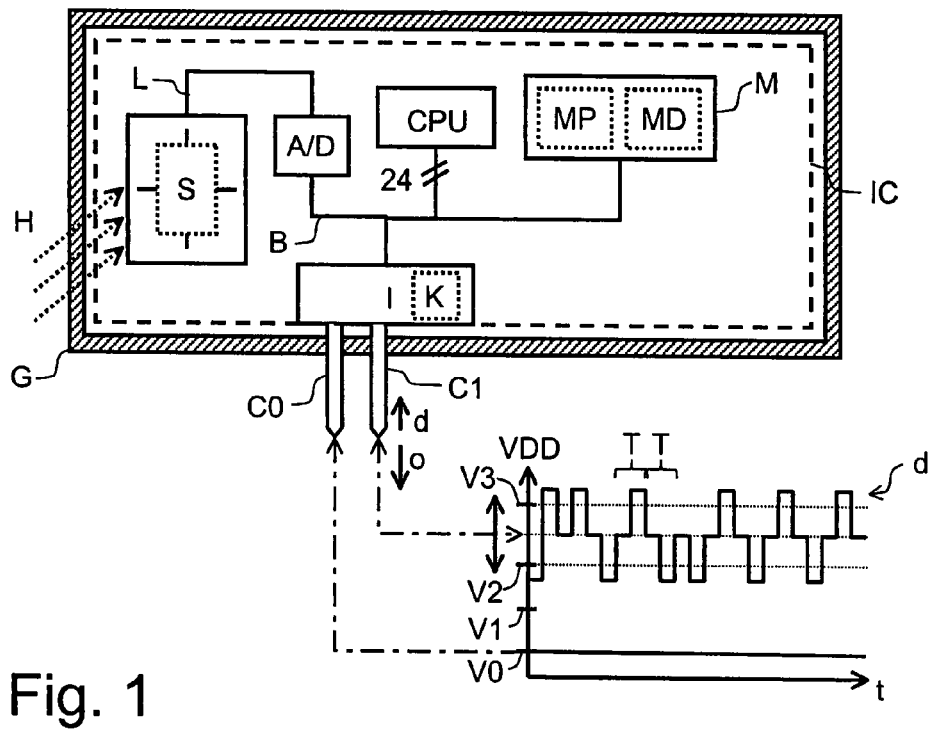
FIG. 1 shows a schematic representation of a cross-sectional view of a housing of a monolithic sensor having a plurality of components.

FIG. 1 shows a schematic representation of a cross-sectional view of a housing G for a monolithic sensor, wherein the monolithically integrated components are only schematically represented. The implementation of the circuit arrangement of the IC integrated in the housing can be realized in a manner that is known in the art for integrated circuit arrangements. In addition to the components indicated in the drawing, other components, which are advantageous or required for the operation of the monolithic sensor, can be also integrated in the circuit arrangement in the usual manner.

The housing G shown in the illustration comprises two terminals C0, C1, used to provide external contact with the components disposed in (or on) the housing G. The terminals C0, C1 are preferably constructed in a known form as so-called pins that can be inserted in a plug socket, not shown. The terminals C0, C1 extend inside the housing G to an interface circuit I. The interface circuit I converts signals or data obtained from the terminals C0, C1 for an internal bus B, or, in the opposite direction, data from the integrated bus B is converted for one or both of the terminals C0, C1. The bus B is preferably designed as a parallel bus, for example as an 8 bit data bus and a 16 bit address bus.

Instead of employing a single 24 bit bus for both address and data transmission, it is also possible to include separate data and address buses in the integrated circuit arrangement IC. In either event, the bus B operates to connect together various components within the integrated circuit arrangement IC.

As shown in FIG. 1, the integrated sensor arrangement includes a sensor S. In the embodiment described herein, the sensor S is configured for the detection of a magnetic field H that exerts an influence on the monolithic sensor. In order to allow the detected field information that is provided by the sensor S in analog format to be further processed by digital components, the sensor S is connected via a line L to an analog/digital converter A/D. The analog/digital converter A/D transmits the digital data either directly to a processor CPU, or via the bus B to either the processor CPU or other components.

In accordance with the exemplary embodiment described herein, the processor CPU is a freely programmable digital processor. To enable the operation of such a freely programmable digital processor CPU, it is connected in a known manner via the bus B to other components required for such operation. In particular, the integrated circuit arrangement IC includes a data memory MD and a program memory MP for this purpose. The data memory MD and the program memory MP can be, for example, a single memory device. However, it is also possible to implement an embodiment which is provided with independent storage devices. In addition to the possibility of connecting the memory M to the processor CPU via the bus B, there is additionally or alternatively also the possibility of creating the processor CPU as a processor core, which is provided with a memory capacity connected directly to the processor.

In order to operate the illustrated integrated circuit arrangement IC, a supply voltage VDD must be input to this arrangement. For this purpose, the first terminal C0 is provided with a reference voltage V0, and the second terminal C1 is provided with the supply voltage VDD. The data is modulated onto the input supply voltage VDD.

In the illustrated embodiment, the input supply voltage VDD is modulated during the course of a time period t as shown in FIG. 1. In this example, consider that a first supply level V1 is required as the supply voltage for the integrated circuit arrangement IC. In such a case, the modulated data is provided as a varying supply voltage VDD having a higher voltage level than the first supply voltage level V1. In particular, two or even more high higher voltage levels V2, V3 are preferably implemented with a corresponding protocol so that not only pure data, but preferably also a clock P can be transmitted with the supply voltage VDD. According to at least one embodiment, the interface circuit I then converts a serial data transmission to parallel data. In data transmission in the opposite direction, such as for providing output data representative of the measurements of the sensor S, the interface circuit I converts parallel data to serial data. To analyze or read the data, or in other words, to determine data d that has been transmitted using the supply voltage VDD, the interface circuit I is preferably equipped with a comparator circuit K.

Figure 2:
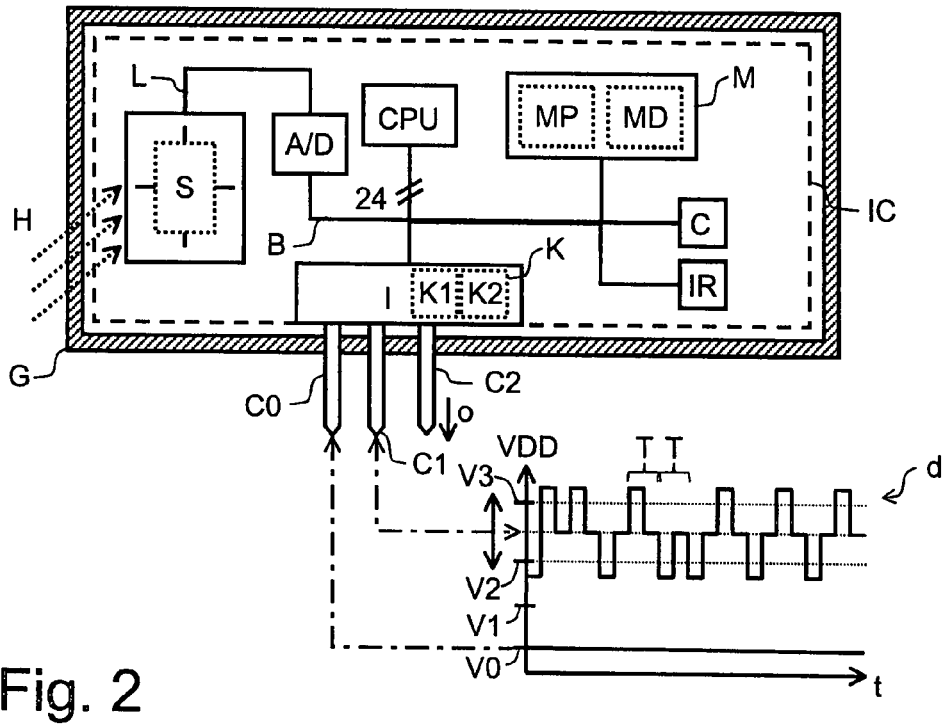
FIG. 2 shows a schematic representation of a cross-sectional view of a modified embodiment.

FIG. 2 shows a modified embodiment of the arrangement of FIG. 1. Only the components and functions that differ from the components and functions shown in FIG. 1 will be explained below, and the same reference symbols are used for the same components and functions, or for components and functions operating in the same manner.

In addition to both terminals C0, C1, the embodiment shown in FIG. 2 also includes a third terminal C2, which extends through the wall thickness of the housing G to the interface circuit I. The third terminal C is thus used to create a high-speed interface for the output of output data o. Such output data can be analog information or analog signals, which would ordinarily be supplied directly from the sensor S. Alternatively, or in addition, other embodiments (such as the one shown in FIG. 2) provide the output data o as digital data.

FIG. 2 also shows a simplified sketch of the comparator circuit K having two integrated comparators K1, K2. Because two comparators K1, K2 are provided, it is possible to detect levels above or below the two different voltage levels, such as the second and the third voltage levels V2, V3, as shown in FIG. 2.

As an alternative to using a value below a certain level, a value above a certain level can be used as a criterion in the area between a given level and a higher level. Similarly, as an alternative to exceeding a level, a value below a certain level in the area between a given level and a lower level can be used as a criterion.

FIG. 2 also shows examples of additional components that may be implemented in the integrated circuit IC, such as a temperature sensor C, which is used to detect an operating temperature and/or an ambient temperature of the integrated circuit IC, and an interrupt circuit IR, which is used to generate an interrupt signal. Because such a temperature sensor C is included, it is possible for the processor CPU to provide an adjustment or compensation to the data obtained from the sensor S, as needed, depending on the momentary temperature. Other such circuit components can, in principle, also be integrated, which makes it possible to provide a compensation for other internal or external interference variables.

The plurality of the components can include, in addition to the components that have been already listed, an independent oscillator, a clock-multiplying phase-coupled loop, a clock input for a quartz or clock generator, a so-called band gap reference, and a regulator supplying a lower supply voltage, a memory bus interface for flash and/or for emulation of a RAM, a boot ROM, a RAM, a EEPROM, a Hall sensor provided with an analog/digital converter and a decimation filter, a temperature sensor provided with an analog/digital converter, a multiplier, a clock divider chain, a timer, a monitoring circuit (watchdog), a CapCom which has for example three inputs and three outputs, a PWM circuit, a LIN-UART interface, a serial test interface, a dual-phase Hall sensor interface and a three-core, dual-phase M interface for master operations and slave operations and/or a two-core, dual-phase M interface for master operations or slave operations.

In a particularly preferred embodiment, an independent, preferably serial, synchronous test interface is included. The synchronous test interface may have its own terminals on the housing G. In addition or as an alternative, instead of providing other terminals for testing and or/programming a plurality of other voltage levels can be also provided to make it possible to realize corresponding testing interventions with a corresponding modulation or coding of the input supply voltage.

The invention claimed is:

1. A monolithic sensor arrangement comprising:
a housing having an integrated sensor;
at least two terminals supported on the housing operably connected to the sensor;
a digital circuit including a freely programmable digital processor, a program memory and a data memory, the digital circuit configured to control and/or process measurement data of the sensor, the digital circuit being integrated in the housing,
wherein the at least two terminals comprise three terminals, and wherein first and second terminals are configured for receiving supply voltage, receiving data transmitted into the sensor arrangement, and for transmission of output data from the sensor arrangement, and a third terminal is configured for unidirectional output of data measured by the sensor.

2. The sensor arrangement according to claim 1, wherein both the supply voltage as well as a clock is receivable via one of the terminals.

3. The circuit arrangement according to claim 2, wherein the clock is modulated onto the supply voltage, and further comprising an integrated interface device configured to demodulate the clock from the supply voltage.

4. The circuit arrangement according to claim 1, further comprising an integrated interface configured to demodulate data from the supply voltage.

5. The circuit arrangement according to claim 1, further comprising an integrated bus having a width of at least 8 bits and configured to connect elements of the digital circuit.

6. The circuit arrangement according to claim 5, further comprising an integrated interface configured to convert serial data obtained from the terminals into parallel data for transmission on the bus.

7. The circuit arrangement according to claim 1, further comprising a serial synchronous test circuit interface, which is configured to be operated and or controlled with a modulation of a supply voltage and/or with a current modulation through two or three connecting contacts.

8. The circuit arrangement according to claim 1, wherein the housing further comprises other terminals configured to provide outputs controlling an external device.

9. The circuit arrangement according to claim 8, wherein the external device is a memory bus interface of an external memory, or a programmable circuit or a test circuit.

10. The circuit arrangement according to claim 1, wherein the sensor includes a Hall sensor.

11. The circuit arrangement according to claim 1, further comprising other integrated components configured to generate a clock signal and/or an interruption signal for the programmable digital processor.

12. The circuit arrangement according to claim 1, further comprising a temperature sensor configured to provide a temperature signal to the digital circuit.

13. A method for controlling a monolithic sensor arrangement, the monolithic sensor arrangement having a housing having an integrated sensor, at least two terminals supported on the housing and operably connected to the sensor, and a digital circuit including a freely programmable digital processor, a program memory and a data memory, the digital circuit configured to control and/or process measurement data of the sensor, the digital circuit integrated in the housing, the method comprising:
modulating a clock and/or data onto a supply voltage using at least two voltage levels above a nominal supply voltage level, the nominal supply voltage used as a supply voltage for an integrated circuit of the sensor arrangement, and providing the modulated supply voltage to at least one supply voltage terminal to the sensor arrangement, wherein the at least two terminals comprise three terminals, and wherein first and second terminals are configured for receiving supply voltage, receiving data transmitted into the sensor arrangement, and for transmission of output data from the sensor arrangement, and a third terminal is configured for unidirectional output of data measured by the integrated sensor.

14. A method for controlling a monolithic sensor arrangement a monolithic sensor arrangement, the monolithic sensor arrangement having a housing having an integrated sensor, at least two terminals supported on the housing and operably connected to the sensor, and a digital circuit including a freely programmable digital processor, a program memory and a data memory, the digital circuit configured to control and/or process measurement data of the sensor, the digital circuit integrated in the housing, the method comprising: converting serial data received at the terminals to parallel data using on a parallel bus interface within the sensor arrangement, wherein the at least two terminals comprise three terminals, and wherein first and second terminals are configured for receiving supply voltage, receiving data transmitted into the sensor arrangement, and for transmission of output data from the sensor arrangement, and a third terminal is configured for unidirectional output of data measured by the integrated sensor.

15. A monolithic sensor arrangement comprising:

a housing having an integrated sensor;

at least two terminals supported on the housing being operably connected to the sensor;

a digital circuit including a freely programmable digital processor, a program memory and a data memory, the digital circuit being configured to control and/or process measurement data of the sensor, the digital circuit being integrated in the housing, wherein a terminal of the at least two terminal is configured such that a clock and/or data signal is modulated onto a supply voltage wherein the at least two terminals comprise three terminals, and wherein first and second terminals are configured for receiving the supply voltage, receiving data transmitted into the sensor arrangement, and for transmission from the sensor arrangement, and a third terminal is configured for unidirectional output of data measured by the integrated sensor.

* * * * *